Figure 1:
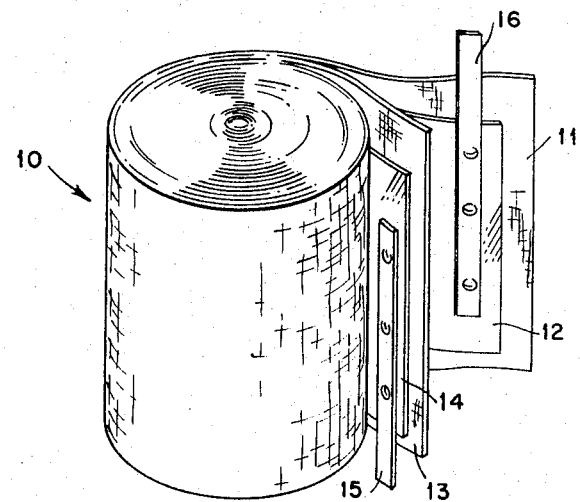

March 21, 1967    H. D. SHEPHERD    3,310,715
ELECTROLYTIC CAPACITOR COMPRISING ANILINE BORATE ELECTROLYTE
Filed Aug. 20, 1964

INVENTOR
HAROLD D. SHEPHERD
BY
ATTORNEY

United States Patent Office 3,310,715
Patented Mar. 21, 1967

3,310,715
ELECTROLYTIC CAPACITOR COMPRISING ANILINE BORATE ELECTROLYTE
Harold D. Shepherd, Indianapolis, Ind., assignor to P. R. Mallory & Co., Inc., Indianapolis, Ind., a corporation of Delaware
Filed Aug. 20, 1964, Ser. No. 390,908
10 Claims. (Cl. 317—230)

The present invention relates to electrolytic devices and more particularly to an improved electrolyte for electrolytic capacitors.

The early aluminum electrolytic capacitors employed "wet" electrolytes which generally consisted of aqueous solutions of inorganic acids, bases or salts. More recently, the "wet" electrolytes have been replaced in part with the so-called "dry" electrolytes which generally consist of highly viscous solutions of boric acids and/or borates dissolved in a polyhydroxy alcohol such as ethylene glycol and including a minor amount of water.

In the ethylene glycol-boric acid system, ammonia gas is bubbled through the solution to effect the adjustment of the pH and further to increase the conductivity of the electrolyte as boric acid is a weak acid. The resulting ammonium borate electrolyte is satisfactory within a given range of temperature and voltage, however, the upper voltage limit is 475 volts with a maximum surge of 550 volts, and even the electrolytes which operate at 475 volts have very poor characteristics at temperatures below —20° C.

Therefore it is an object of the present invention to produce electrolytic capacitors which overcome the deficiencies of prior art.

It is an object of the present invention to produce an electrolyte for electrolytic capacitors operable over wider temperature ranges without adverse changes in the electrical properties.

It is an object of the present invention to provide an electrolyte for electrolytic capacitors with excellent cold temperature characteristics.

It is an object of the present invention to provide an electrolyte for electrolytic capacitors which will operate consistently at 500 volts with a surge voltage of 575 volts.

The present invention in another of its aspects, relates to novel features of the instrumentalities of the present invention described therein for teaching the principal object of the present invention and to the novel principles employed in the instrumentalities whether or not these features and principles may be used in the said objects or in the said field.

With the aforementioned objects enumerated, other objects will be apparent to those possessing ordinary skill in the art. Other objects will appear in the following description, appended claims and appended drawings. The invention resides in the novel construction, combination, arrangement, and cooperation of elements as hereinafter described and more particularly as defined in the appended claims.

The appended drawings illustrate several novel and different embodiments of the present invention and are constructed to function in the most advantageous mode devised for practical application of the basic principles involved in the hereinafter described invention.

In the drawings:

FIGURE 1 is a view in perspective of a partially wound electrolytic capacitor body to which the present invention is applicable.

Figure 2:
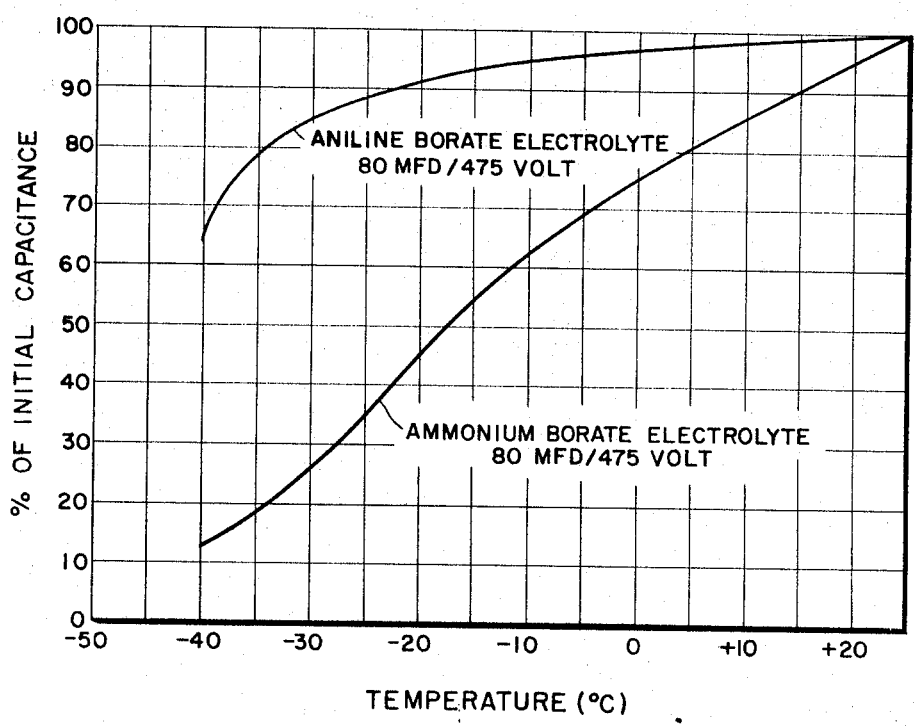

FIGURE 2 presents a curve of percent of initial capacitance vs. temperature for two electrolytes, one of which is disclosed by the present invention.

Referring now to the drawing, FIGURE 1 presents an electrolytic capacitor of the wound foil type denoted generally by reference number 10. Capacitor 10 comprises anode 12 of a film-forming metal such as aluminum, niobium, tantalum or zirconium, having on its surface an oxide film which functions as the active dielectric for the capacitor. Said dielectric oxide film is formed on anode 12 in accordance with accepted anodization techniques. Cathode 14 may be composed of either a film-forming metal or a relatively inert metal such as silver, depending upon the capacitor application and its requirements. Anode 12 and cathode 14 are separated by spacer strips 11 and 13 composed of paper or other porous material. Spacers 11 and 13 are impregnated with the electrolyte of the present invention. Electrodes 12 and 14 are provided with tabs 15 and 16, to serve as terminals for capacitor 10. Tabs 15 and 16 may extend from the same or opposite ends of the capacitor.

FIGURE 2 presents a graphic comparison of the percent of initial capacitance characteristics of two electrolytes at varying temperatures. One curve illustrates the performance of a solution of ammonium borate and ethylene glycol, a well known capacitor electrolyte. The other curve illustrates the performance of a solution of aniline borate in ethylene glycol. The latter solution comprises an improved low temperature electrolyte of the present invention. From these curves, it is readily apparent that the electrolyte of the present invention affords substantially greater capacitance stability throughout the temperature range, and is especially advantageous at extreme temperatures such as —40° C., whereas the ammonium borate electrolyte exhibits a radical decrease in capacitance at low temperatures.

Broadly stated, the electrolyte of the present invention consists of boric acid or a suitable borate dissolved in ethylene glycol to which a prescribed amount of aniline is added in order to adjust the pH of the solution. Although borates and monoalkyl ethers of ethylene glycol and diethylene glycol are suitable, the preferred composition consists of boric acid, ethylene glycol and aniline.

Although it has been found that the weight percentages of the electrolyte constituents employed herein may vary considerably for capacitor applications, a typical formulation having excellent properties would be as follows:

| | Grams |
|---|---|
| Ethylene glycol | 88 |
| Boric acid | 12 |
| Aniline | 11 |

It has been found that the solute should not exceed 25% by weight of the total weight of the electrolyte composition.

The aniline borate dissolved in ethylene glycols or mono-alkyl ethers of ethylene glycol and diethylene glycol such as the monomethyl, monoethyl and monobutyl ethers of ethylene and diethylene glycol provides a conductive solution to transport electrical charges between the anode and the cathode of a capacitor. The electrolyte also provides oxygen for the repair of the oxide film on the positive plate of the capacitor. This invention provides an electrolyte which will operate at high voltages (500 v. D.C.) with surge voltages as high as 575 volts. Further, the changes in electrical characteristics of capacitors incorporating this electrolyte are quite small as compared with standard ammonium borate electrolytes at cold temperatures. The change in capacitance, resistance and D.C. leakage current on life tests are remarkably less than that of the ammonium borate electrolyte.

The electrolyte of the present invention, as hereinbefore described in several of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

Having thus described my invention, I claim:

1. An electrolytic capacitor comprising oppositely disposed and spaced electrodes, at least one of said electrodes composed of a film-forming metal having a dielectric film formed on the surface thereof, a porous insulative spacer disposed between and separating said electrodes, and an electrolyte impregnating said spacer consisting of 1.0 to 17.0% aniline, 5.0 to 25.0% boric acid and 58.0 to 94.0% ethylene glycol, said electrolyte having an operating voltage of about 500 volts and a surge voltage of about 575 volts.

2. An electrolytic capacitor comprising oppositely disposed and spaced electrodes, at least one of said electrodes composed of a film-forming metal having a dielectric film formed on the surface thereof, the other of said electrodes being formed from an inert metal, a porous insulative spacer disposed between and separating said electrodes, and an electrolyte impregnating said spacer consisting of 1.0 to 17.0% aniline, 5.0 to 25.0% boric acid and 58.0 to 94.0% ethylene glycol, said electrolyte having an operating voltage of about 500 volts and a surge voltage of about 575 volts.

3. An electrolytic capacitor comprising oppositely disposed and spaced electrodes, at least one of said electrodes composed of a film-forming metal selected from the group consisting of aluminum, niobium, tantalum and zirconium, said one electrode having a dielectric film formed on the surface thereof, a porous insulative spacer disposed between and separating said electrodes, and an electrolyte impregnating said spacer consisting of 1.0 to 17.0% aniline, 5.0 to 25.0% boric acid and 58.0 to 94.0% ethylene glycol, said electrolyte having an operating voltage of about 500 volts and a surge voltage of about 575 volts.

4. An electrolytic capacitor comprising oppositely disposed and spaced electrodes, at least one of said electrodes composed of a film-forming metal selected from the group consisting of aluminum, niobium, tantalum and zirconium, said one electrode having a dielectric film formed on the surface thereof, a porous insulative spacer disposed between and separating said electrodes, and an electrolyte impregnating said spacer consisting of 6.1% aniline, 14.1% boric acid and 79.8% ethylene glycol, said electrolyte having an operating voltage of about 500 volts and a surge voltage of about 575 volts.

5. An electrolytic capacitor comprising a convolutely wound assembly of a superimposed pair of film-forming metal foil electrodes having a dielectric oxide film formed thereon, said film-forming metal foil electrode selected from the group consisting of aluminum, niobium, tantalum and zirconium, said one electrode having a dielectric film formed on the surface thereof, a porous paper spacer disposed between and separating said electrodes, and an electrolyte impregnating said spacer consisting of 1.0 to 17.0% aniline, 5.0 to 25.0% boric acid and 58.0 to 94.0% ethylene glycol, said electrolyte having an operating voltage of about 500 volts and a surge voltage of about 575 volts.

6. An electrolytic capacitor comprising a convolutely wound assembly of a superimposed pair of film-forming metal foil electrodes having a dielectric oxide film formed thereon, said film-forming metal foil electrodes selected from the group consisting of aluminum, niobium, tantalum and zirconium, said one electrode having a dielectric film formed on the surface thereof, a porous paper spacer disposed between and separating said electrodes, and an electrolyte impregnating said spacer consisting of 1.0 to 17.0% aniline, 5.0 to 25.0% boric acid and 58.0 to 94.0% of a mono-alkyl ether, said electrolyte having an operating voltage of about 500 volts and a surge voltage of about 575 volts.

7. An electrolytic capacitor comprising a convolutely wound assembly of a superimposed pair of film-forming metal foil electrodes having a dielectric oxide film formed thereon, said film-forming metal foil electrodes selected from the group consisting of aluminum, niobium, tantalum and zirconium, said one electrode having a dielectric film formed on the surface thereof, a porous paper spacer disposed between and separating said electrodes, and an electrolyte impregnating said spacer consisting of 1.0 to 17.0% aniline, 5.0 to 25.0% boric acid and 58.0 to 94.0% of a mono-alkyl ether selected from the group consisting of ethylene glycol and diethylene glycol, said electrolyte having an operating voltage of about 500 volts and a surge voltage of about 575 volts.

8. An electrolytic capacitor comprising a convolutely wound assembly of a superimposed pair of film-forming metal foil electrodes having a dielectric oxide film formed thereon, said film-forming metal foil electrodes selected from the group consisting of aluminum, niobium, tantalum and zirconium, said one electrode having a dielectric film formed on the surface thereof, a porous paper spacer disposed between and separating said electrodes, and an electrolyte impregnating said spacer consisting of 6.1% aniline, 14.1% boric acid and 79.8% of a mono-alkyl ether selected from the group consisting of ethylene glycol and diethylene glycol, said electrolyte having an operating voltage of about 500 volts and a surge voltage of about 575 volts.

9. An electrolytic capacitor comprising a convolutely wound assembly of a superimposed pair of metal foil electrodes, at least one of said electrodes composed of a film forming metal selected from the group consisting of aluminum, niobium, tantalum and zirconium, said one electrode having a dielectric film formed on the surface thereof, the other of said electrodes composed of silver, a porous paper spacer disposed between and separating said electrodes, and an electrolyte impregnating said spacer consisting of 1.0 to 17.0% aniline, 5.0 to 25.0% boric acid and 58.0 to 94.0% of a mono-alkyl ether selected from the group consisting of ethylene glycol and diethylene glycol, said electrolyte having an operating voltage of about 500 volts and a surge voltage of about 575 volts.

10. An electrolytic capacitor comprising a convolutely wound assembly of a superimposed pair of foil electrodes, at least one of said electrodes composed of a film-forming metal selected from the group consisting of aluminum, niobium, tantalum and zirconium, said one electrode having a dielectric film formed on the surface thereof, the other of said electrodes composed of silver, a porous paper spacer disposed between and separating said electrodes, and an electrolyte impregnating said spacer consisting of 6.1% aniline, 14.1% boric acid and 79.8% ethylene glycol, said electrolyte having an operating voltage of about 500 volts and a surge voltage of about 575 volts.

References Cited by the Examiner

UNITED STATES PATENTS

| | | | |
|---|---|---|---|
| 1,829,177 | 10/1931 | Yngve | 317—230 |
| 2,024,210 | 12/1935 | Edelman | 317—230 |
| 2,036,669 | 5/1936 | Yngve | 317—230 |
| 2,078,772 | 4/1937 | Pitt | 317—230 |

JAMES D. KALLAM, *Primary Examiner.*